United States Patent
Seok et al.

(10) Patent No.: US 11,523,423 B2
(45) Date of Patent: Dec. 6, 2022

(54) METHOD AND APPARATUS FOR COORDINATED MULTI-ACCESS POINT CHANNEL ACCESS IN A WIRELESS NETWORK

(71) Applicant: MediaTek Singapore Pte. Ltd., Solaris (SG)

(72) Inventors: Yongho Seok, San Jose, CA (US); Jianhan Liu, San Jose, CA (US); James Chih-Shi Yee, San Jose, CA (US); James June-Ming Wang, San Jose, CA (US); Thomas Edward Pare, Jr., San Jose, CA (US); Shihchieh Lee, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/748,242

(22) Filed: Jan. 21, 2020

(65) Prior Publication Data
US 2020/0245352 A1    Jul. 30, 2020

Related U.S. Application Data

(60) Provisional application No. 62/925,822, filed on Oct. 25, 2019, provisional application No. 62/797,968, filed on Jan. 29, 2019.

(51) Int. Cl.
*H04W 28/20* (2009.01)
*H04W 72/14* (2009.01)
(Continued)

(52) U.S. Cl.
CPC ......... *H04W 72/14* (2013.01); *H04W 52/367* (2013.01); *H04W 72/04* (2013.01)

(58) Field of Classification Search
CPC ..... H04W 84/12; H04W 72/04; H04W 28/26; H04W 72/0453; H04W 16/02;
(Continued)

(56) References Cited

U.S. PATENT DOCUMENTS

2014/0328264 A1   11/2014   Merlin et al.
2015/0063251 A1*   3/2015   Asterjadhi ............ H04W 74/04
                                                370/329
(Continued)

FOREIGN PATENT DOCUMENTS

GB         2549967 A1    11/2017
WO    2020047196 A1     3/2020

OTHER PUBLICATIONS

Kiscon Ryu; et al. Consideration on multi-AP coordination for EHT. Symposium. doc.: IEEE 802.11-18/1982r1. server date Jan. 14, 2019; downloaded by EPO on Jan. 15, 2019. Jan. 9, 2019.

*Primary Examiner* — Tu X Nguyen

(57) ABSTRACT

Embodiments of the present invention provide a method and apparatus for coordinated multi-AP channel access in a wireless network. A wireless AP that obtains a transmission opportunity (TXOP) (a "coordinator AP") can grant one or more STAs or APs under control of the coordinator AP the use of some of the bandwidth granted by the TXOP. The STAs or APs that are granted the use of the bandwidth are referred to as "coordinated APs." Thereafter, a coordinator AP or a coordinated AP can create a new basic service set (BSS) of devices for coordinating data transmissions. For example, the coordinated AP may serve as a relay, where the coordinated AP services devices in a new BSS by sending and receiving data with a coordinator AP in a different BSS.

19 Claims, 19 Drawing Sheets

(51) Int. Cl.
*H04W 52/36* (2009.01)
*H04W 72/04* (2009.01)

(58) Field of Classification Search
CPC ..... H04W 28/20; H04W 72/14; H04W 92/20;
H04W 74/04; H04W 16/14; H04W 16/10;
H04W 28/18; H04W 88/08; H04B 7/024;
H04J 11/0023; H04J 11/0073
See application file for complete search history.

(56) References Cited

U.S. PATENT DOCUMENTS

| | | |
|---|---|---|
| 2015/0163769 A1 | 6/2015 | Lee et al. |
| 2016/0197655 A1 | 7/2016 | Lee et al. |
| 2016/0249349 A1 | 8/2016 | Trainin et al. |
| 2017/0332385 A1 | 11/2017 | Shirali |
| 2020/0076552 A1* | 3/2020 | Cherian ............ H04W 72/0426 |

* cited by examiner

METHOD AND APPARATUS FOR COORDINATED MULTI-ACCESS POINT CHANNEL ACCESS IN A WIRELESS NETWORK

CROSS-REFERENCE TO RELATED APPLICATIONS

This application claims the benefit of and priority to provisional patent application Ser. No. 62/797,968, with filing date Jan. 29, 2019, and provisional patent application Ser. No. 62/925,822, with filing date Oct. 25, 2019, which are both hereby incorporated by reference in their entirety.

FIELD

Embodiments of the present invention generally relate to the field of wireless communications. More specifically, embodiments of the present invention relate to systems and methods for coordinated operations of wireless access points for serving multiple wireless stations concurrently.

BACKGROUND

Modern electronic devices typically send and receive data with other electronic devices wirelessly using Wi-Fi based technology that includes a wireless access point (AP) servicing one or more wireless stations (STAs) in a basic service set (BSS). However, it may be advantageous in some circumstances for a wireless STA to connect to a different wireless device (e.g., a wireless STA) that is physically closer or subject to less interference than an available AP or an AP that the STA is currently connected to. For these reasons, an STA may be granted the ability to act as a wireless AP for a period of time (a "granted AP" or "coordinated AP") to service a BSS. However, an STA acting as an AP to service a different BSS concurrently can lead to adjacent channel interference that degrades performance of the wireless network.

Therefore, what is needed is an approach to wireless data transmission that allows a wireless AP to share bandwidth of a transmission opportunity (TXOP) so that a wireless STA can act as a wireless AP for coordinating data transmissions with one or more STAs in another BSS. Moreover, an approach is needed that is aware of adjacent channel interference (ACI) and that can synchronize transmission times of multiple BSSs to avoid this source of interference.

SUMMARY

Accordingly, embodiments of the present invention provide a method and apparatus for coordinated operations of wireless access points for serving multiple wireless stations concurrently including coordinated OFDMA operation and coordinated OFDMA channel selection.

According to one embodiment, a method of coordinating transmissions of a first wireless access point (AP) using a second wireless AP is disclosed. The method includes receiving a frame granting a transmission opportunity (TXOP) at the second wireless AP, sending a frame from the second AP to the first AP, the frame includes a TXOP duration and a TXOP bandwidth, and signaling the first wireless AP using the second wireless AP to grant a portion of a bandwidth allocated by the TXOP to the first AP according to the TXOP duration and the TXOP bandwidth. The first wireless AP services a wireless station using the portion of the bandwidth.

According to some embodiments, the portion of bandwidth includes one or more 20 MHz wireless channels.

According to some embodiments, the first AP transmits data frames to a first basic service set (BSS), and the second wireless AP transmits data frames to a second BSS.

According to some embodiments, the frame includes a maximum transmit power, and the first wireless AP transmits data frames to the wireless station in the first BSS using the maximum transmit power.

According to some embodiments, the method includes the second wireless AP scheduling an RU for downlink and uplink transmission of the first wireless AP, and the RU is within an allocated bandwidth indicated by the TXOP bandwidth.

According to some embodiments, the second wireless AP schedules the RU using a Coordinated OFDMA Announcement (COA) control frame.

According to some embodiments, the method further includes the first wireless AP performing a channel switch from a first primary channel to a second primary channel.

According to some embodiments, the second primary channel is within an allocated bandwidth indicated by the TXOP bandwidth.

According to some embodiments, the method further includes the second wireless AP reporting a DL buffer status and a UL buffer status of the second BSS.

According to some embodiments, the method further includes performing a protection mechanism using the first wireless AP.

According to some embodiments, performing the protection mechanism includes performing an RTS/CTS hand shake.

According to some embodiments, the method further includes initiating a PIFS using the first wireless AP, performing a CCA during the PIFS using the first wireless AP, and sending an RTS frame when the CCA is idle during the PIFS.

According to some embodiments, the method further includes synchronizing uplink and downlink transmissions of the first BSS and the second BSS, and the synchronizing mitigates adjacent channel interference of the first wireless AP and the second AP.

According to some embodiments, the synchronizing includes the second wireless AP indicating an uplink duration and a downlink duration using an A-control subfield of the frame.

According to another embodiment, a coordinator wireless access point (AP) is disclosed, including a processor and a memory coupled to the processor and including instructions executed by the processor to perform a method for coordinating transmissions of a coordinated wireless AP. The method includes receiving a frame granting a transmission opportunity (TXOP), sending a frame including an A-Control subfield to the coordinated wireless AP, the A-Control subfield including a TXOP duration and a TXOP bandwidth, and signaling the coordinated wireless AP to grant a portion of a bandwidth allocated by the TXOP to the coordinator wireless AP according to the TXOP duration and the TXOP bandwidth. The coordinated wireless AP services a wireless station using the portion of the bandwidth.

According to some embodiments, the portion of bandwidth includes one or more 20 MHz wireless channels.

According to some embodiments, the method includes the coordinator wireless AP scheduling an RU for downlink and uplink transmission of the coordinated wireless AP, and the RU is within an allocated bandwidth indicated by the TXOP bandwidth.

According to some embodiments, the second wireless AP schedules the RU using a Coordinated OFDMA Announcement (COA) control frame.

According to some embodiments, the method includes the coordinated wireless AP performing a channel switch from a first primary channel to a second primary channel.

According to a different embodiment, a non-transitory computer-readable storage medium having embedded therein program instructions, which when executed by one or more processors of a device, causes the device to execute a process for coordinating transmissions of a first wireless access point (AP) using a second wireless AP is disclosed. The method includes receiving a frame granting a transmission opportunity (TXOP) at a second wireless AP, sending a frame including an A-Control subfield from the second AP to a first AP, the A-Control subfield including a TXOP duration and a TXOP bandwidth, and signaling the first wireless AP using the second wireless AP to grant a portion of a bandwidth allocated by the TXOP to the first AP according to the TXOP duration and the TXOP bandwidth. The first wireless AP services a wireless station using the portion of the bandwidth.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
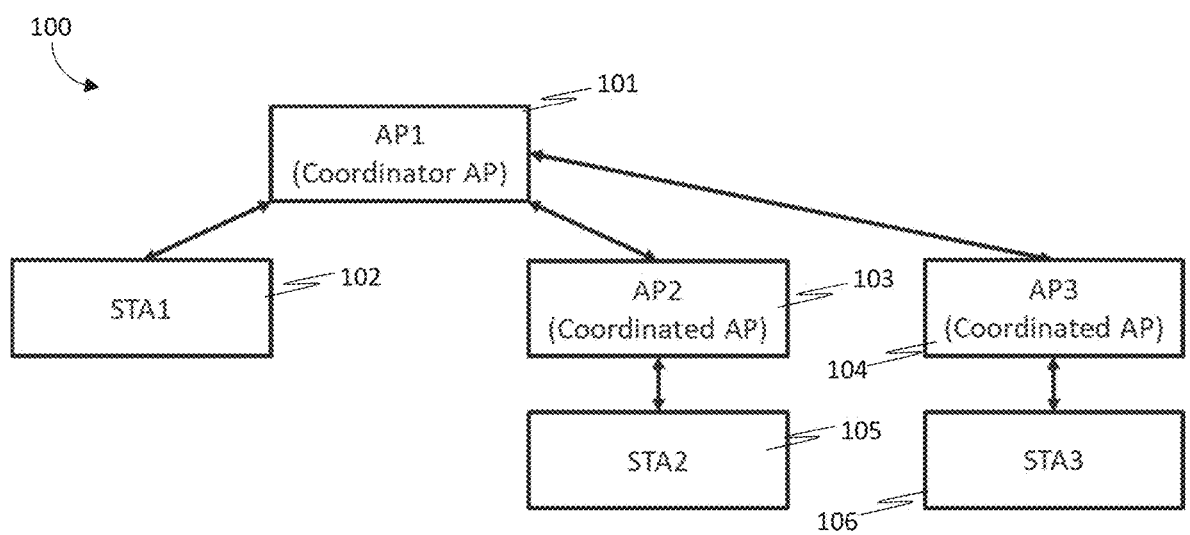
FIG. 1 is a block diagram of an exemplary wireless network including a coordinator AP1 that coordinates the wireless transmissions of a coordinated AP2 and a coordinated AP3 depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 17 and 18) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "coordinating," "storing," "transmitting," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and Apparatus for Coordinated Multi-Access Point Channel Access in a Wireless Network As used herein, the term "EHT" may refer to a recent generation of wireless communication (Wi-Fi) known as Extremely High Throughput (EHT) and is defined according to the IEEE 802.11be standards. The term station (STA) may refer to an electronic device capable of sending and receiving data over Wi-Fi that is not operating as an access point (AP).

Embodiments of the present invention provide a method and apparatus for coordinated multi-AP channel access in a wireless network. A wireless AP that obtains a transmission opportunity (TXOP) (a "coordinator AP") can grant one or more STAs or APs under control of the coordinator AP the use of some of the bandwidth granted by the TXOP. The STAs or APs that are granted the use of the bandwidth are referred to as "coordinated APs." Thereafter, a coordinator AP or a coordinated AP can create a new basic service set (BSS) of devices for coordinating data transmissions. For example, the coordinated AP may serve as a relay, where the coordinated AP services devices in a new BSS by sending and receiving data with a coordinator AP in a different BSS.

With regard to FIG. 1, an exemplary wireless network 100 including a coordinator AP1 101 that coordinates the wireless transmissions of a coordinated AP2 103 and a coordinated AP3 104 is depicted according to embodiments of the present invention. Coordinated AP2 103 and coordinated AP3 104 can be wireless STAs or APs. Coordinator AP1 101 obtains a TXOP and can optionally grant the use a part of the bandwidth available under the TXOP (e.g., one or more 20 MHz channels) to one or more APs under the control of the first AP (e.g., coordinated AP2 103 and coordinated AP3 104). Coordinated AP2 103 and coordinated AP3 104 can be connected to coordinator AP1 101 over a wired or wireless network.

Bandwidth allocated to coordinated AP2 103 and/or coordinated AP3 104 by AP1 101 can be used to serve coordinated STA2 105 and coordinated STA3 106. As depicted in FIG. 1, coordinated AP2 103 services STA2 105 and coordinated AP3 104 services STA3 106 using the bandwidth allocated by coordinator AP1 101. Coordinator AP1 101 can continue to serve STA1 102 using the remaining bandwidth not allocated to coordinated AP2 or coordinated AP3. As described in more detail below with regard to FIG. 2, STAs serviced by a coordinated AP (e.g., STA 2 105, and STA3 106) can be members of the same or different BSSs.

Figure 2:
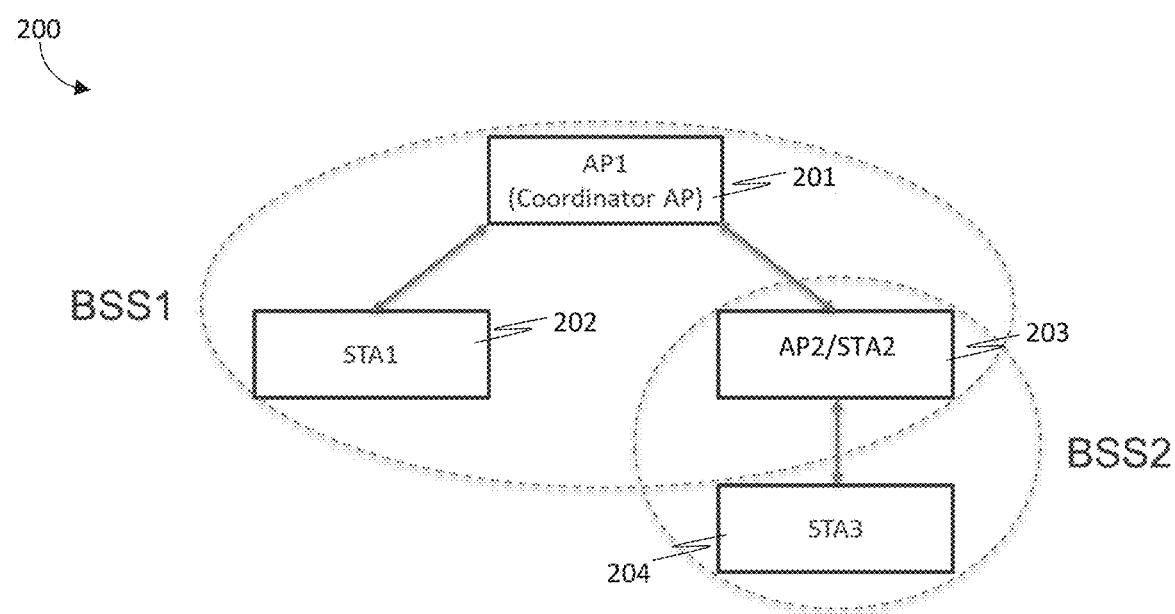
FIG. 2 is a block diagram of an exemplary wireless network including a coordinator AP1 that coordinates the wireless transmissions of a coordinated AP2/STA2 depicted according to embodiments of the present invention.

With regard to FIG. 2, an exemplary wireless network 200 including a coordinator AP1 201 that coordinates the wireless transmissions of a coordinated AP2/STA2 203 is depicted according to embodiments of the present invention. Coordinated AP2/STA2 203 is configured as a coordinated AP in BSS1 and can be a wireless STA or AP. As depicted in FIG. 1B, STA1 202 and coordinated AP2/STA2 203 serviced by AP1 201 are members of BSS1, and coordinated AP2/STA2 203 and STA3 204 are members of BSS2. STA3 204 is serviced by coordinated AP2/STA2 203 as a coordinated AP, and the coordinated AP2/STA2 203 can serve as a relay. In this case, the coordinated AP2/STA2 203 performs at least two main function. First, coordinated AP2/STA2 203 acts as a non-AP STA for associating with the coordinator AP1 201; and second, coordinated AP2/STA2 203 acts as an AP for serving its own BSS (BSS2). According to some embodiments of the present invention, each AP (a coordinator AP or a coordinated AP) can create its own BSS.

Figure 3:
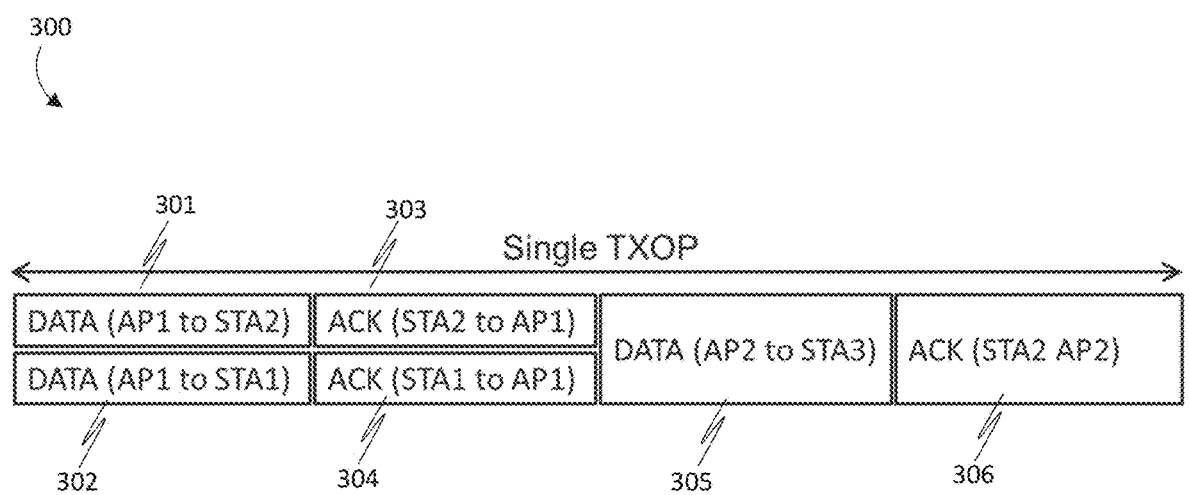
FIG. 3 is a data transmission timing diagram for performing a multi-AP frame exchange sequence in a wireless network according to embodiments of the present invention.

FIG. 3 is a data transmission timing diagram for performing a multi-AP frame exchange sequence 300 in a wireless network according to embodiments of the present invention. As depicted in FIG. 3, a single TXOP obtained by an AP1 can be shared with AP2 and/or AP3. AP1 is referred to as a "coordinator AP," and AP2 and AP3 are referred to as "coordinated APs". AP1 sends data frames 302 and 301 to STA1 and STA2, and STA1 and STA2 respond with corresponding ACK frames 304 and 303. Thereafter, AP2 acting as a coordinated AP sends a data frame 305 to STA3, and STA3 responds with a corresponding ACK frame 306. Multi-AP frame exchange sequence 300 occurs within a single TXOP assigned to AP1.

Figure 4:
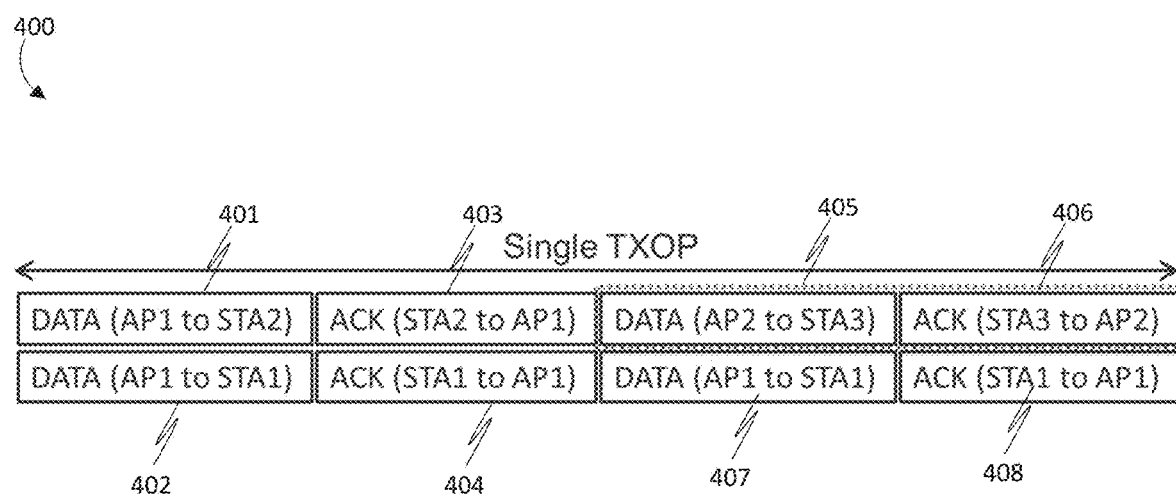
FIG. 4 is a data transmission timing diagram for performing a multi-AP frame exchange sequence in a wireless network to grant partial bandwidth of a TXOP to a coordinated AP according to embodiments of the present invention.

FIG. 4 is a data transmission timing diagram for performing a multi-AP frame exchange sequence 400 in a wireless network to grant partial bandwidth of a TXOP to a coordinated AP according to embodiments of the present invention. As depicted in FIG. 4, a single TXOP obtained by AP1 can be shared with AP2 and/or AP3 by allocating part of the available bandwidth to a coordinated AP and using remaining bandwidth to serve a wireless STA. AP1 is referred to as a coordinator AP, and AP2 and AP3 are referred to as coordinated APs. AP1 sends data frames 402 and 401 to STA1 and STA2, and STA1 and STA2 respond with corresponding ACK frames 404 and 403. Thereafter, AP1 continues to serve STA1, and AP2 acts as a coordinated AP to send a data frame 405 to STA3. STA3 responds with a corresponding ACK frame 406. AP1 sends a data frame 407 to STA1, and STA1 response with a corresponding ACK frame 408. Multi-AP frame exchange sequence 400 occurs within a single TXOP assigned to AP1.

As depicted in Table I, an A-Control subfield of an HE variant HT Control field can be used to indicated which portion of the TXOP duration is granted to a coordinated AP, as well as the granted bandwidth, and the granted maximum transmit power. The granted TXOP duration indicates the maximum TXOP duration that can be used by the coordinated AP; the granted bandwidth indicates the maximum bandwidth that can be used by the coordinated AP; and the granted maximum transmit power information indicates the maximum transmit power that can be used by the BSS associated with the coordinated AP.

TABLE I

| Control ID | Granted TXOP Duration | Granted Bandwidth | Granted Max Transmit Power |
| --- | --- | --- | --- |
| 4 bits | TBD (up to 10 bits) | 8 bits | 8 bit |

Figure 5:
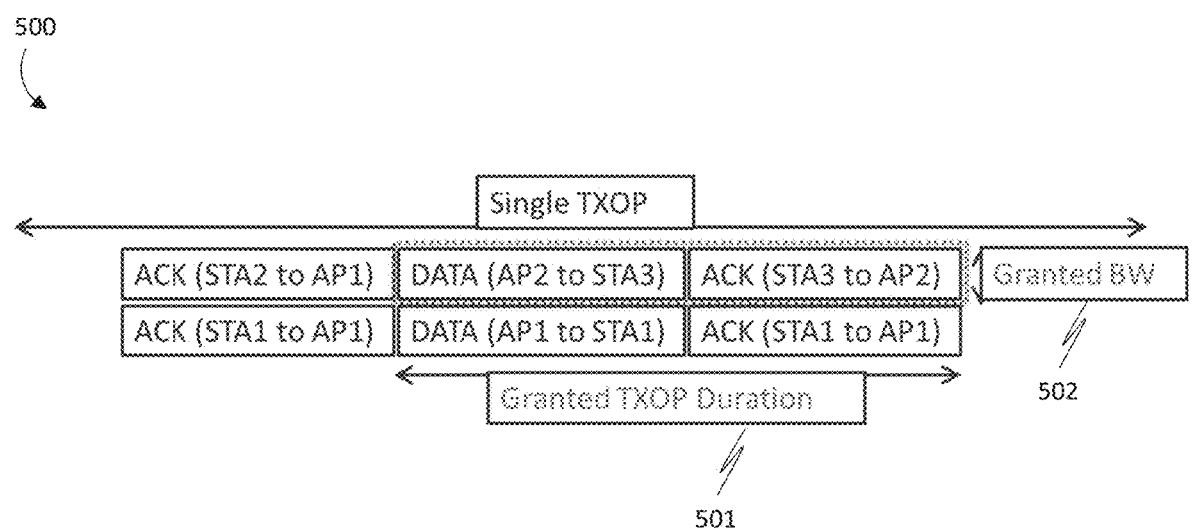
FIG. 5 is an exemplary data transmission timing diagram for performing a multi-AP frame exchange sequence in a wireless network for exchanging RTS/CTS frames according to embodiments of the present invention.

FIG. 5 is an exemplary data transmission timing diagram for performing a multi-AP frame exchange sequence 500 in a wireless network for exchanging RTS/CTS frames according to embodiments of the present invention. The granted bandwidth field 502 and granted TXOP duration field 501 may be signaled in an A-Control field of an HE variant HT Control field, for example. The granted TXOP duration 501 indicates the maximum TXOP duration that can be used by the coordinated AP2, and the granted bandwidth 502 indicates the maximum bandwidth that can be used by the coordinated AP2.

If the coordinated AP needs to perform a protective mechanism, such as an RTS/CTS handshake, the AP uses a Point Coordination Function (PCF) Interframe Space (PIFS) after being granted a shared TXOP. RTS/CTS frames are used to implement virtual carrier sensing for carrier sense multiple access with collision avoidance. To provide guaranteed reservation of the common medium and uninterrupted data transmission, an STA will use RTS/CTS message exchange. Specifically, according to some embodiments, the coordinated AP2 uses the PIFS before sending the RTS frame, and the CCA performed during the PIFS can detect ACI caused by the coordinator AP1. Otherwise, STA3 is unable to send the CTS frame because the channel is busy immediately prior to the PIFS of the RTS reception.

Figure 6:
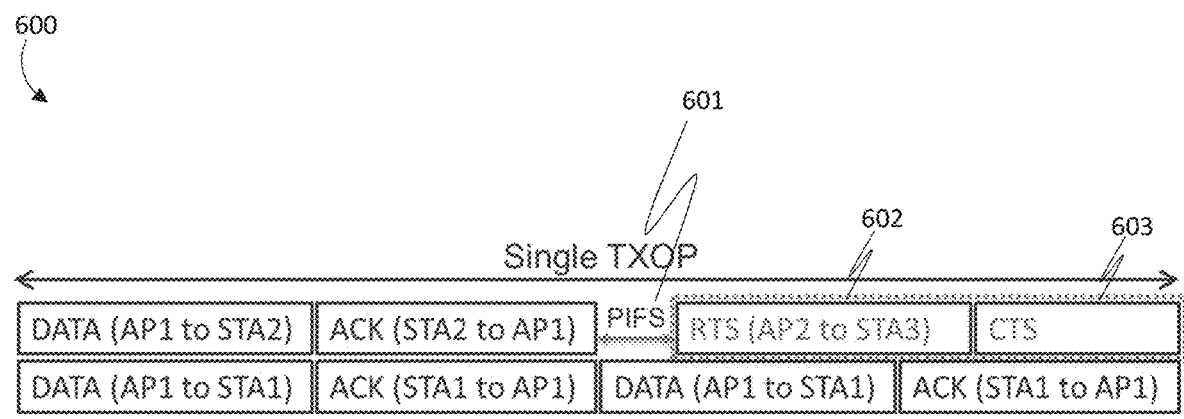
FIG. 6 is an exemplary data transmission timing diagram for performing a multi-AP frame exchange sequence in a wireless network for performing a Clear Channel Assessment (CCA) during a Point Coordination Function (PCF) Interframe Space (PIFS) according to embodiments of the present invention.

FIG. 6 is an exemplary data transmission timing diagram for performing a multi-AP frame exchange sequence 600 in a wireless network for performing a Clear Channel Assessment (CCA) during a PIFS 601 according to embodiments of the present invention. The coordinated AP2 that was granted some or all of a TXOP on a secondary channel can perform CCA during the PIFS 601. Thereafter, when the CCA is idle during the PIFS 601, the AP2 sends an RTS frame 602 and STA3 responds with a CTS frame 603. Otherwise, the coordinator AP1 indicates if the AP2 is required to perform the protection mechanism. For example, the protection requirement field can be carried in an A-Control subfield.

Figure 7:
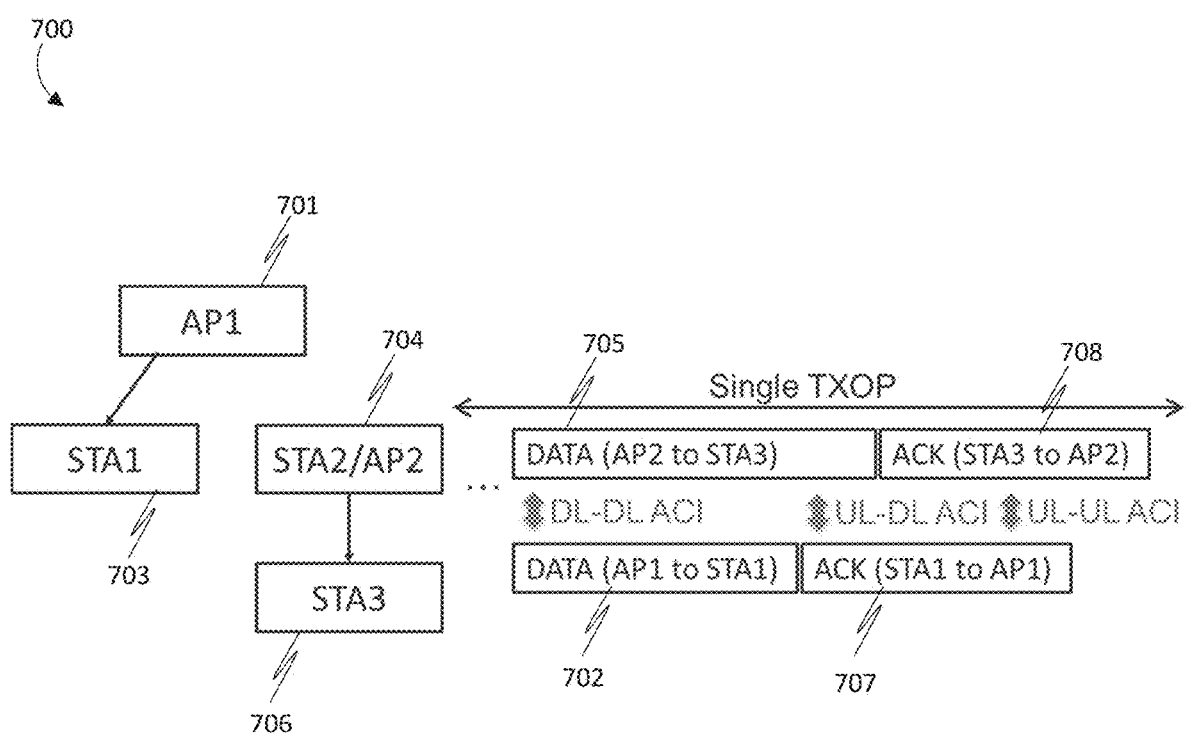
FIG. 7 is an exemplary data transmission timing diagram depicting adjacent channel interference (ACI) of downlink (DL) transmissions and uplink (UL) transmissions when performing a multi-AP frame exchange sequence in a wireless network according to embodiments of the present invention.
Figure 8:
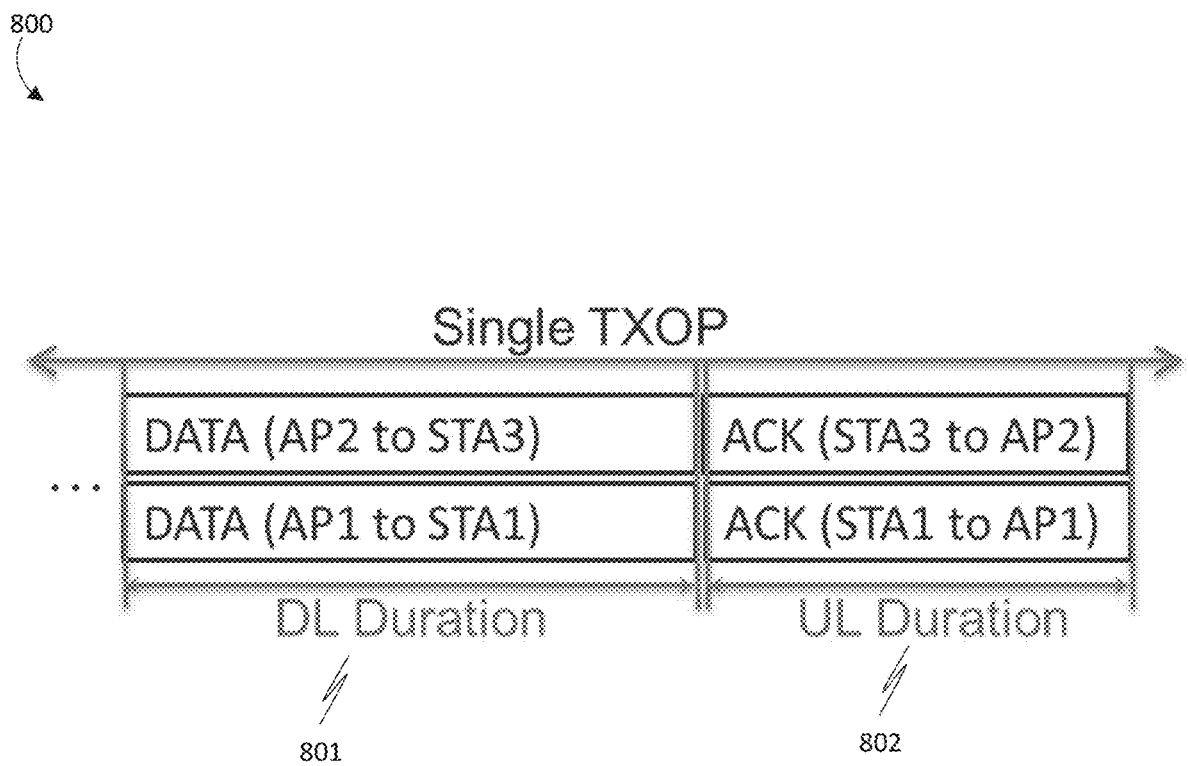
FIG. 8 is an exemplary data transmission timing diagram depicting synchronized UL and DL transmissions for mitigating ACI when performing a multi-AP frame exchange sequence in a wireless network according to embodiments of the present invention.

FIG. 7 is an exemplary data transmission timing diagram depicting adjacent channel interference (ACI) of downlink (DL) transmissions and uplink (UL) transmissions when performing a multi-AP frame exchange sequence 700 in a wireless network according to embodiments of the present invention. Coordinator AP1 701 sends a data frame 702 to STA1 703 over a first wireless channel, and coordinated AP2 704 sends a data frame 705 to STA3 706. STA1 703 and STA3 706 respond with corresponding ACK frames 707 and 708. ACI from concurrent transmissions from multiple BSSs transmissions is depicted, including the DL-DL ACI caused by the data frames and the UL-DL/Ul-UL ACI caused by the ACK frames. When the UL-DL ACI is significant, the UL and DL transmission time of multiple BSSs can be synchronized to mitigate ACI. FIG. 8 is an exemplary data transmission timing diagram depicting synchronized UL and DL transmissions for mitigating ACI when performing a multi-AP frame exchange sequence 800 in a wireless network according to embodiments of the present invention. An AP (AP1) can indicate the DL Duration 801 and UL Duration 802 information using an A-Control subfield, for example.

The BSS Colors of the AP and the coordinating APs are typically the same color. Otherwise, the non-AP STAs associated with the coordinated AP cannot send the UL frame to the coordinated AP because of the Network Allocation Vector (NAV). Typically the primary channel of the BSS operated by the coordinating AP and the primary channel of the BSS operated by the coordinated should be different; otherwise, the non-AP STA can report the BSS Color collision to an associated coordinated AP and an associated coordinating AP.

According to some embodiments, before sending a grant signal to share a TXOP with a coordinated AP, an MU-RTS/CTS exchange between the coordinating AP and the coordinated APs can instruct a non-AP STAs associated with the coordinated AP to set the inter-BSS NAV according to the CTS frame. Because the RA field of the CTS frame is different than the BSSID of the coordinated AP, in order to avoid the inter-BSS NAV setting of the non-AP STAs, the CTS frame sent by the coordinated uses the CTS-to-self frame, and the USER Info field of the MU-RTS frame included in the CTS type field. When the CTS type field is set to 0, the non-AP STA identified by corresponding USER Info field responds with the CTS frame in which the RA field is set to the transmitted address (TA) of the MU-RTS frame. When the CTS type field is set to 1, the non-AP STA identified by corresponding USER Info field responds with the CTS-to-self frame in which the RA field is set to the BSSID of the coordinated AP co-located with the non-AP STA.

Figure 9:
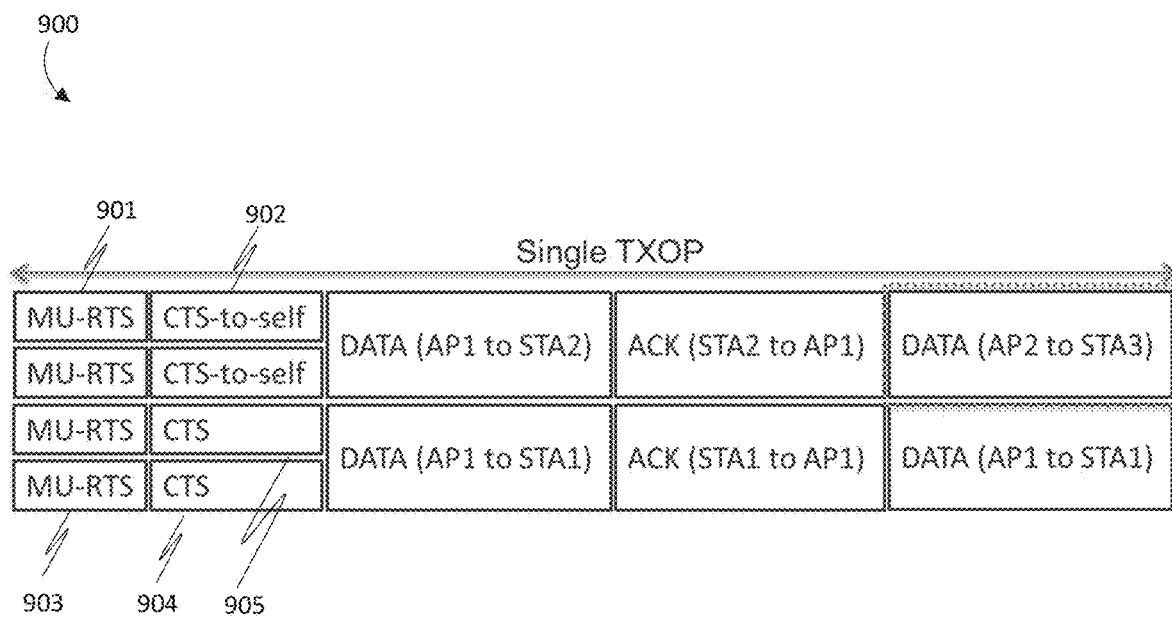
FIG. 9 is an exemplary data transmission timing diagram for sending a CTS-to-self frame with an RA field set to the BSSID of a coordinated AP when performing a multi-AP frame exchange sequence in a wireless network according to embodiments of the present invention.

FIG. 9 is an exemplary data transmission timing diagram 900 for sending a CTS-to-self frame with an RA field set to the BSSID of a coordinated AP when performing a multi-AP frame exchange sequence 900 in a wireless network according to embodiments of the present invention. After receiving an MU-RTS frame 901, the STA2 (a non-AP STA associated with the AP1 and co-located with the coordinated AP2) sends a CTS-to-self frame 902 in which the RA field is set to the BSSID of the AP2. In the MU-RTS frame 901, the USER Info field addressed to the STA2 indicates the granted bandwidth of a TXOP on which the STA2 sends the CTS-to-self frame 902. After receiving the MU-RTS 903, the STA1 (a non-AP STA is associated with the coordinating AP1) sends a CTS frame 904 in which the RA field is set to the BSSID of the AP1. In the MU-RTS frame 903, the RU Allocation of the USER Info field addressed to the STA1 does not overlapped with the granted bandwidth of the STA2 because the RA field of the CTS frame 905 sent by the STA2 is different with the RA field of the CTS frame 904 sent by the STA1.

Coordinated OFDMA Link Setup

According to some embodiments, for coordinated OFDMA link setup, an AP that wants to participate in a coordinated OFDMA operation as a coordinator AP announces to neighbor APs the desired coordinator AP role and includes the coordinated OFDMA operation parameters in the Beacon or Probe Response frames. An AP that wants to participate in the coordinated OFDMA operation as the coordinated AP establishes the coordinated OFDMA link with the AP that announced the coordinator AP role. Moreover, the coordinated AP can report the DL and UL buffer status of its serving BSS to the AP with which it has set up the coordinated OFDMA link. For example, the DL and UL buffer status for the coordinated AP's serving BSS can be encoded in either an A-Control field (e.g., a variation of BSR) of a QoS Null frame or in a new Action frame. In most cases, the DL and UL buffer status should be sent in an SU PPDU. If the coordinated AP supports an UL MU operation, it can send the DL and UL buffer status in an HE TB PPDU.

The coordinator AP allocates the bandwidths, lengths, and additional TXVECTOR parameters for DL and UL transmission. The allocation can be announced using a Coordinated OFDMA Announcement (COA) control frame sent to one or more coordinated APs. The DL TXVECTOR parameter can include FORMAT, GI+LTF Size, Number Of HE-SIG-B Symbols Or MU-MIMO Users, Number of HE-LTF Symbols and Midamble Periodicity, Pre-FEC Padding Factor, and PE Disambiguity. The UL TXVECTOR parameter can include GI and LTF Type, Number Of HE-LTF Symbols and Midamble Periodicity, Pre-FEC Padding Factor, and PE Disambiguity.

The coordinator AP does not allocate the RUs for the STAs associated with the coordinated APs. Instead, the coordinated AP schedules the DL and UL transmissions to its associated STAs subject to the constrained parameters from the received COA frame. For example, when the coordinated AP schedules the RU for the DL and UL transmission, the allocated RU should be within the allocated bandwidth from the coordinator AP.

Figure 10:
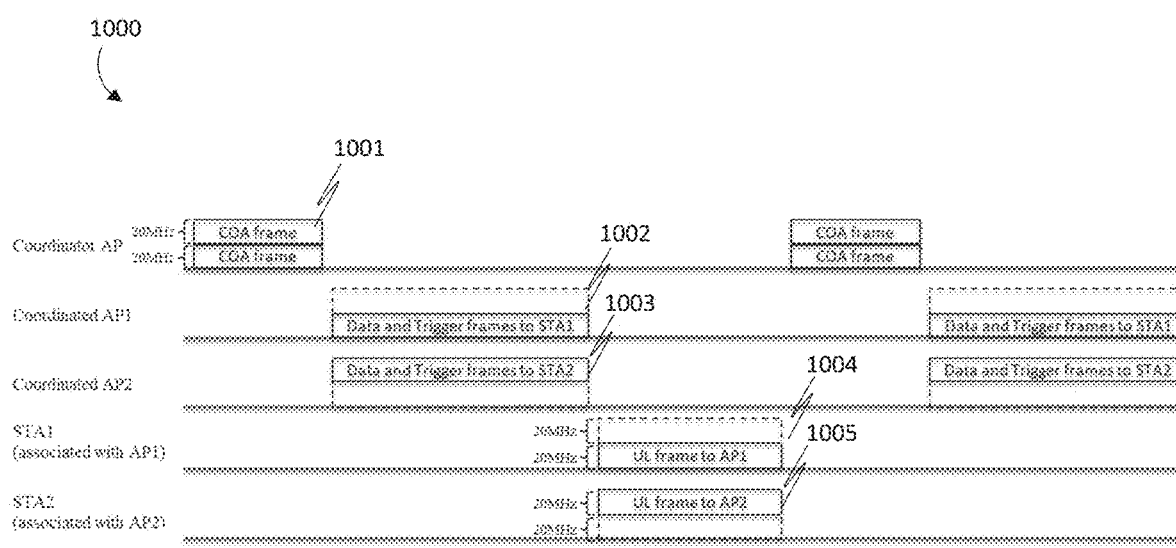
FIG. 10 is an exemplary transmission schedule for coordinated OFDMA operation depicted according to embodiments of the present invention.

With regard to FIG. 10, an exemplary transmission schedule 1000 for coordinated OFDMA operation is depicted according to embodiments of the present invention. In the example of FIG. 10, COA frame 1001 indicates the allocated bandwidths for the coordinated AP1 and the coordinated AP2 for the lower 20 MHz and the upper 20 MHz, respectively. The coordinated AP1 schedules the RU for STA1 within the lower 20 MHz. The coordinated AP2 schedules the RU for STA2 within the upper 20 MHz. The Coordinated AP1 and Coordinated AP2 then send Data and Trigger frames 1002 and 1003 to STA1 and STA2, respectively. The STA1 associated with Coordinated AP1 sends UL frame 1004 to Coordinated AP1 responsive to Data and Trigger frames 1002, and STA2 associated with Coordinated AP2 sends UL frame 1005 to Coordinated AP2 responsive to Data and Trigger frames 1003.

Figure 11:
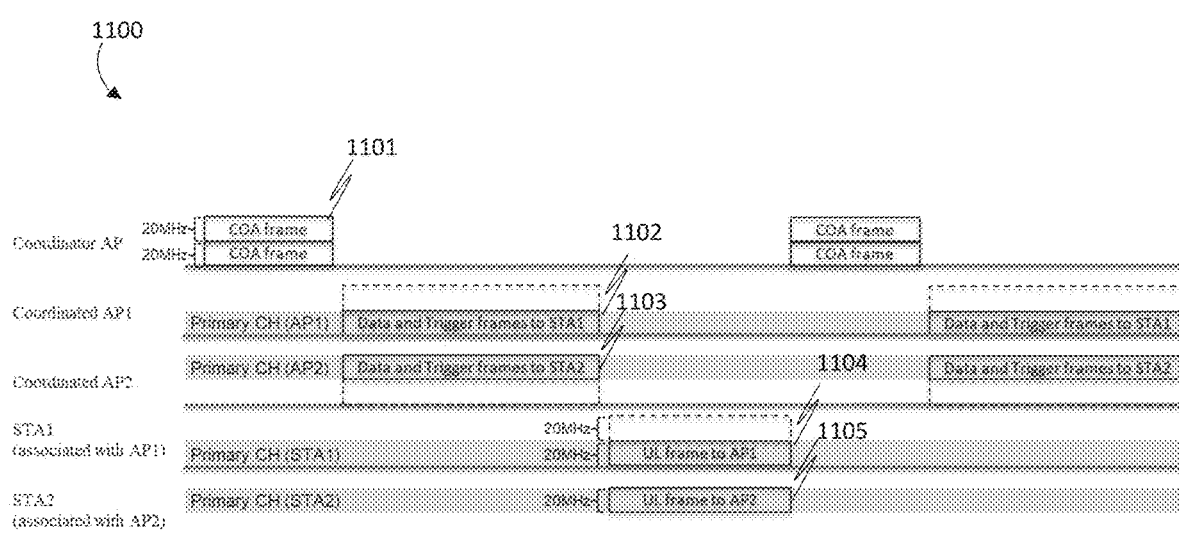
FIG. 11 is an exemplary transmission schedule for coordinated OFDMA primary channel selection depicted according to embodiments of the present invention, where the COA frame indicates the allocated bandwidths for the coordinated AP1 and the coordinated AP2 for the lower 20 MHz and the upper 20 MHz channels, respectively.

FIG. 11 depicts an exemplary transmission schedule 1100 for coordinated OFDMA primary channel selection according to embodiments of the present invention. COA frame 1101 indicates the allocated bandwidths for the coordinated AP1 and the coordinated AP2 for the lower 20 MHz and the upper 20 MHz channels, respectively. Data and Trigger frames 1102 and 1103 sent to STA1 and STA2, respectively, are used for primary channel selection. UL frames 1104 and 1105 sent by STA1 and STA2 are sent over the selected primary channel.

Figure 12:
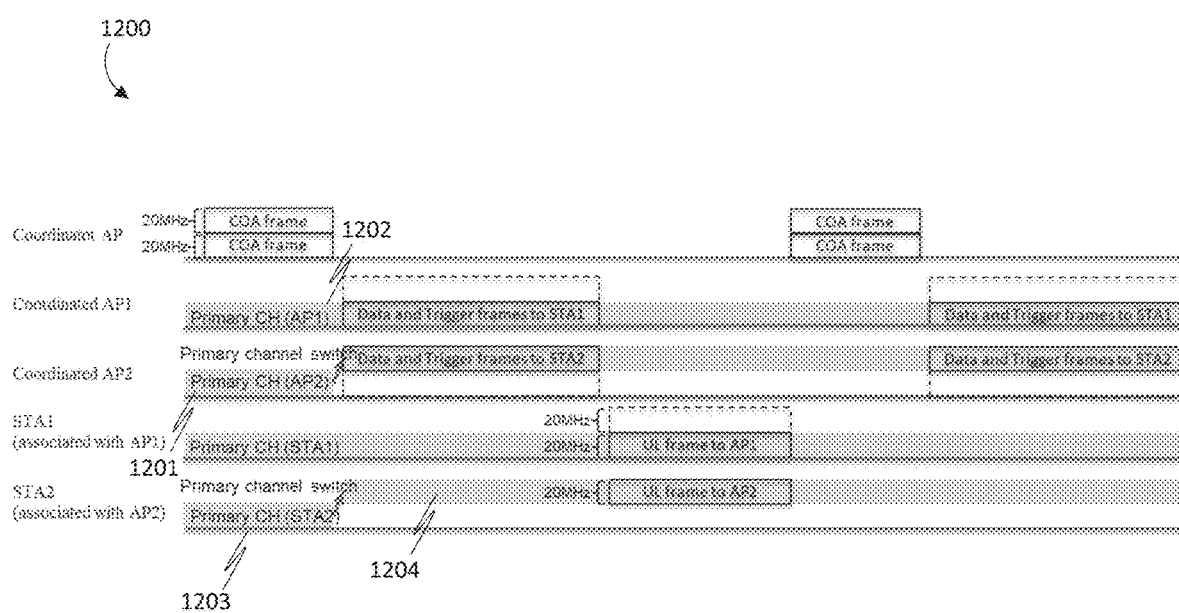
FIG. 12 is an exemplary transmission schedule for switching an STA from a first primary channel to a second primary channel according to embodiments of the present invention.

As depicted in the exemplary transmission schedule 1200 of FIG. 12, according to embodiments of the present invention, when the AP or APs that participated in the coordinated OFDM operation select the same primary channel 1201, the coordinated AP (along with its associated STAs) whose allocated bandwidth does not cover its own primary channel can switch the selected primary channel to another channel 1202 which is within the allocated bandwidth. STA2 associated with AP2 also switches from a first primary channel 1203 to a second primary channel 1204 accordingly.

Figure 13:
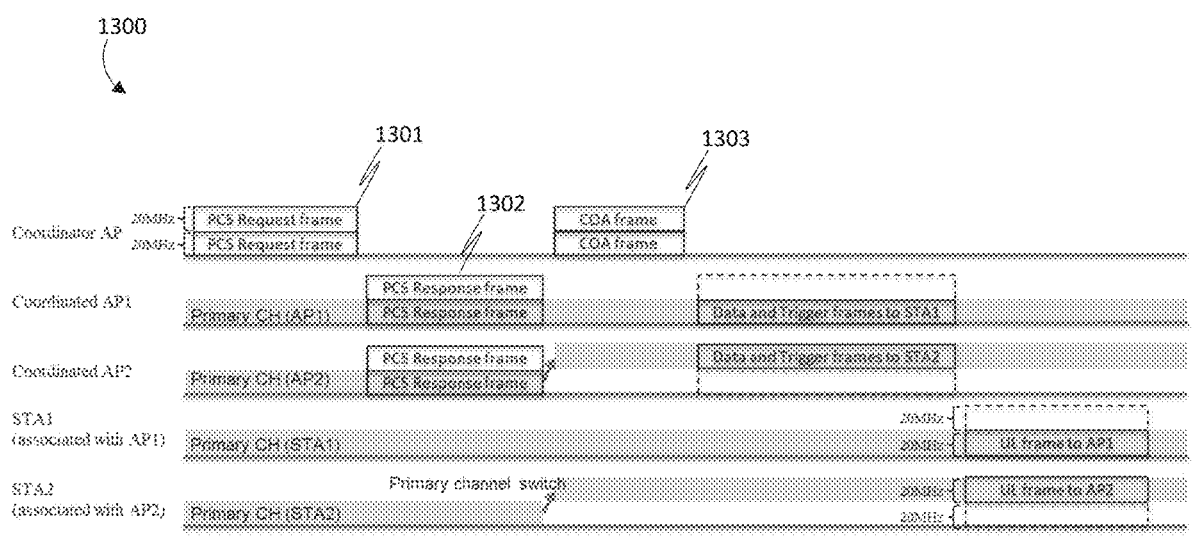
FIG. 13 is an exemplary transmission schedule for a coordinator AP and a coordinated AP exchanging a primary channel switch (PCS) request frame and a primary channel switch response frame over 20 MHz channels before performing coordinated OFDAM transmissions according to embodiments of the present invention.

As depicted in the exemplary transmission schedule 1300 of FIG. 13, because the STAs associated with the coordinated APs may not be visible to the coordinator AP ("hidden nodes"), the associated STAs may not listen to COA frame 1303. Therefore, the coordinator AP and the coordinated AP can may exchange a primary channel switch (PCS) request frame 1301 and a primary channel switch response frame 1302 over each 20 MHz channel before the coordinated OFDAM transmissions.

Figure 14:
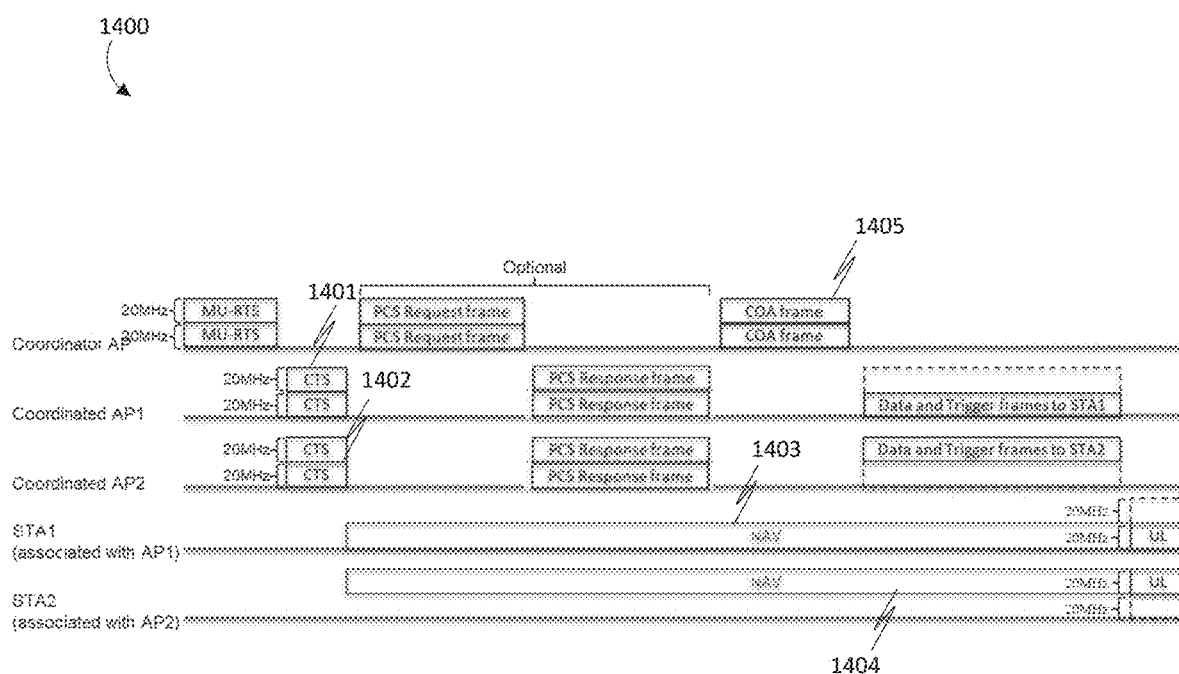
FIG. 14 is an exemplary transmission schedule for establishing NAV protection for coordinated OFDMA operation depicted according to embodiments of the present invention.

With regard to FIG. 14, an exemplary transmission schedule 1400 for establishing NAV protection for coordinated OFDMA operation is depicted according to embodiments of the present invention. The NAV is used to protect access to the transmission medium for a frame exchange sequence. Access to the medium is restricted for the time specified by the NAV. Because other third-party STAs associated with the coordinated APs can access the medium during the COA frame transmission 1405 if they are hidden from the coordinator AP, the coordinator AP may need to trigger the MU-RTS and CTS frames exchange before the coordinated OFDAM transmissions. After receiving CTS frames 1401 and 1402 over a respective 20 MHz channel, STAs associated with the coordinated APs may configure Basic NAVs 1403 and 1404. In this case, the STAs cannot send a UL frame when the CS Required field of the trigger frame sent by the coordinated AP is set to 1.

Figure 15:
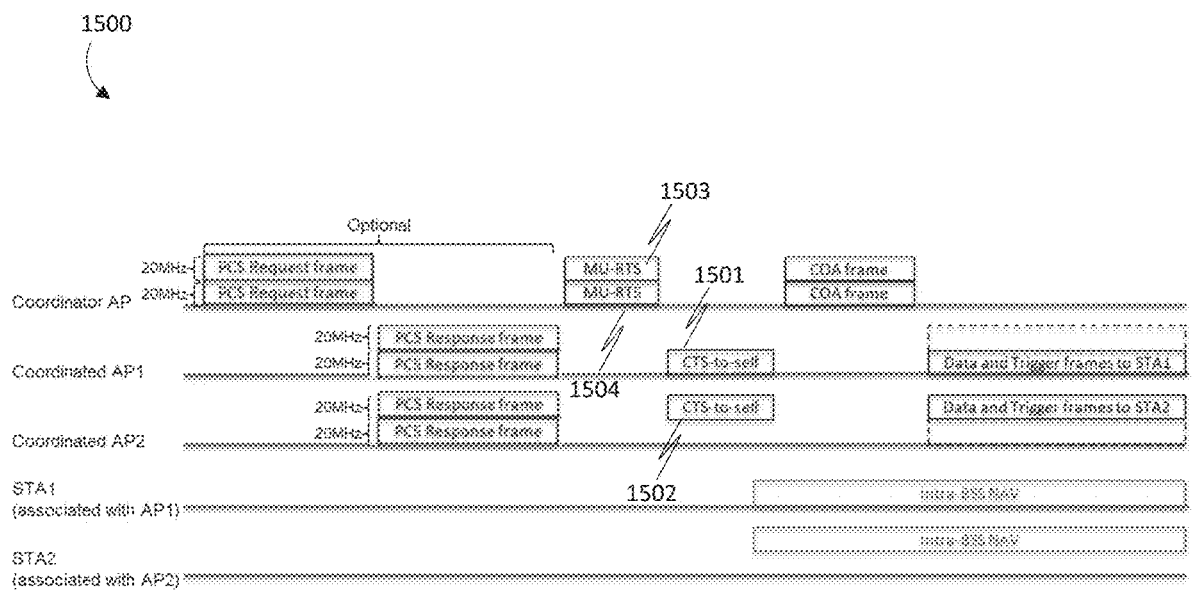
FIG. 15 is exemplary transmission schedule 1500 including a PCS request and the PCS response frame exchanged before MU-RTS frame transmission, where the Duration fields of the PCS Request and PCS Response frames only cover a single transaction (and not the remaining TXOP duration) according to embodiments of the present invention.

With regard to FIG. 15, as by depicted exemplary transmission schedule 1500, when the PCS request and the PCS response frames are exchanged before the MU-RTS frame transmission, the Duration fields of the PCS Request and PCS Response frames may only cover a single transaction and not the remaining TXOP duration. Specifically, as depicted in FIG. 15, according to some embodiments, the coordinated APs transmits CTS-to-self frames 1501 and 1502 on its primary channel after receiving the MU-RTS frames 1503 and 1504 from the coordinator AP. The MU-RTS frames 1503 and 1504 indicate the CTS frame type (e.g., CTS frame or CTS-to-self frame). However, when the coordinator AP allocates to the coordinated AP the bandwidth that does not cover the coordinated AP's own primary channel, the coordinator AP and the coordinated AP exchange PCS request and the primary channel switch PCS response frames before the transmission of CTS-to-self frames 1501 and 1502. The coordinated APs can then transmit the respective CTS-to-self frame frames on the switched temporary primary channel.

Figure 16:
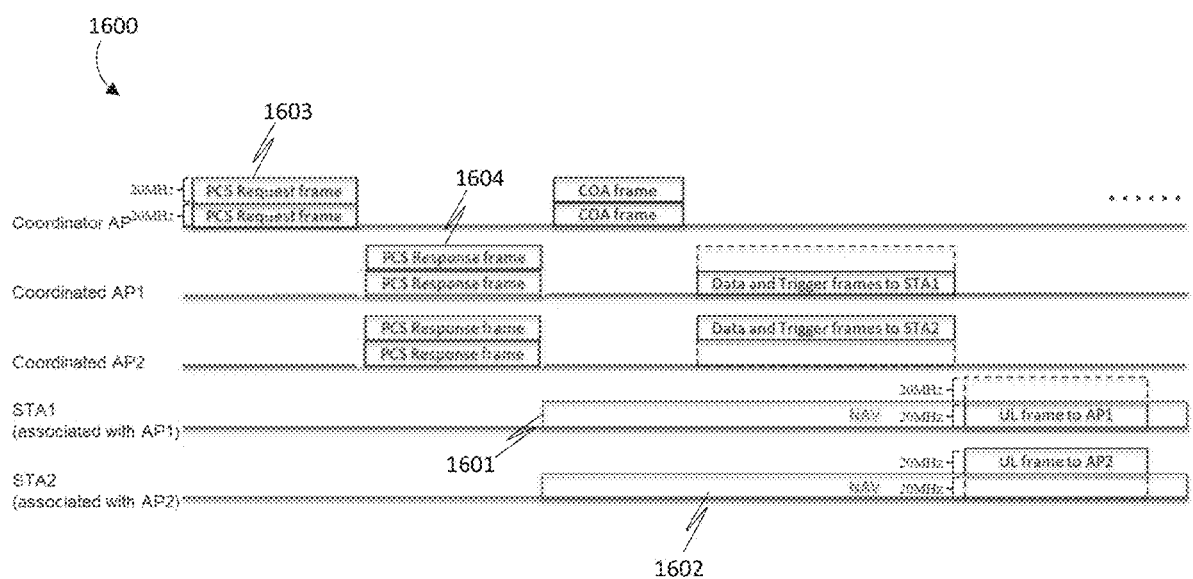
FIG. 16 is an exemplary transmission schedule where the MU-RTS and CTS procedure is replaced by a primary channel switch (PCS) request and response procedure using PCS request frames and PCS response frames according to embodiments of the present invention.

Alternatively, according to other embodiments as depicted in exemplary transmission schedule 1600 of FIG. 16, in order to reduce the protocol overhead, the NAV protection of the MU-RTS and CTS procedure can be replaced by the primary channel switch (PCS) request and response procedure using PCS request frames 1603 and PCS response frames 1604. In this case, the Duration fields of the PCS Request and PCS Response frames are set to the NAV protection times 1601 or 1602.

Figure 17:
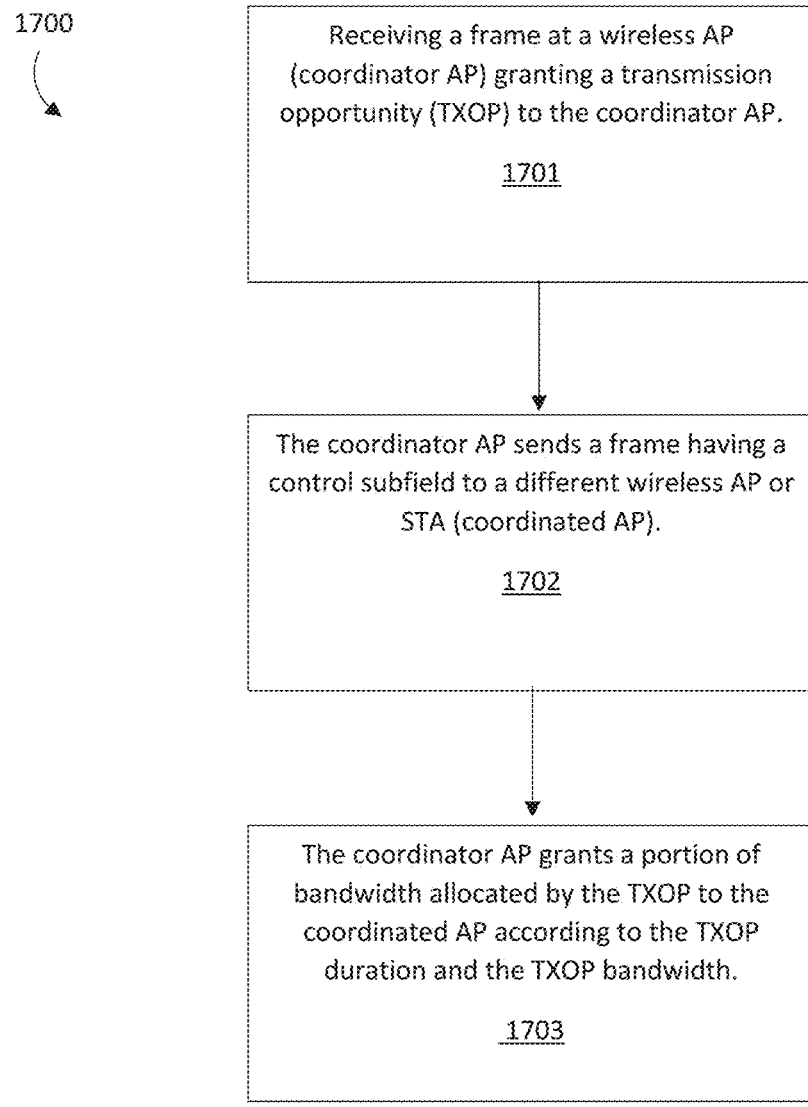
FIG. 17 is a flow chart depicting an exemplary sequence of computer implemented steps for establishing coordinated multi-AP operation according to embodiments of the present invention.

With regard to FIG. 17, a flow chart of an exemplary sequence of computer implemented steps 1700 for establishing coordinated multi-AP operation is depicted according to embodiments of the present invention.

At step 1701, a frame is received at a wireless AP (coordinator AP) granting a transmission opportunity (TXOP) to the coordinator AP.

At step 1702, the coordinator AP sends a frame having a control subfield to a different wireless AP or STA (coordinated AP). The control subfield includes a TXOP duration and a TXOP bandwidth, and optionally a maximum transmission power.

At step 1703, the coordinator AP grants a portion of bandwidth allocated by the TXOP to the coordinated AP according to the TXOP duration and the TXOP bandwidth.

Figure 18:
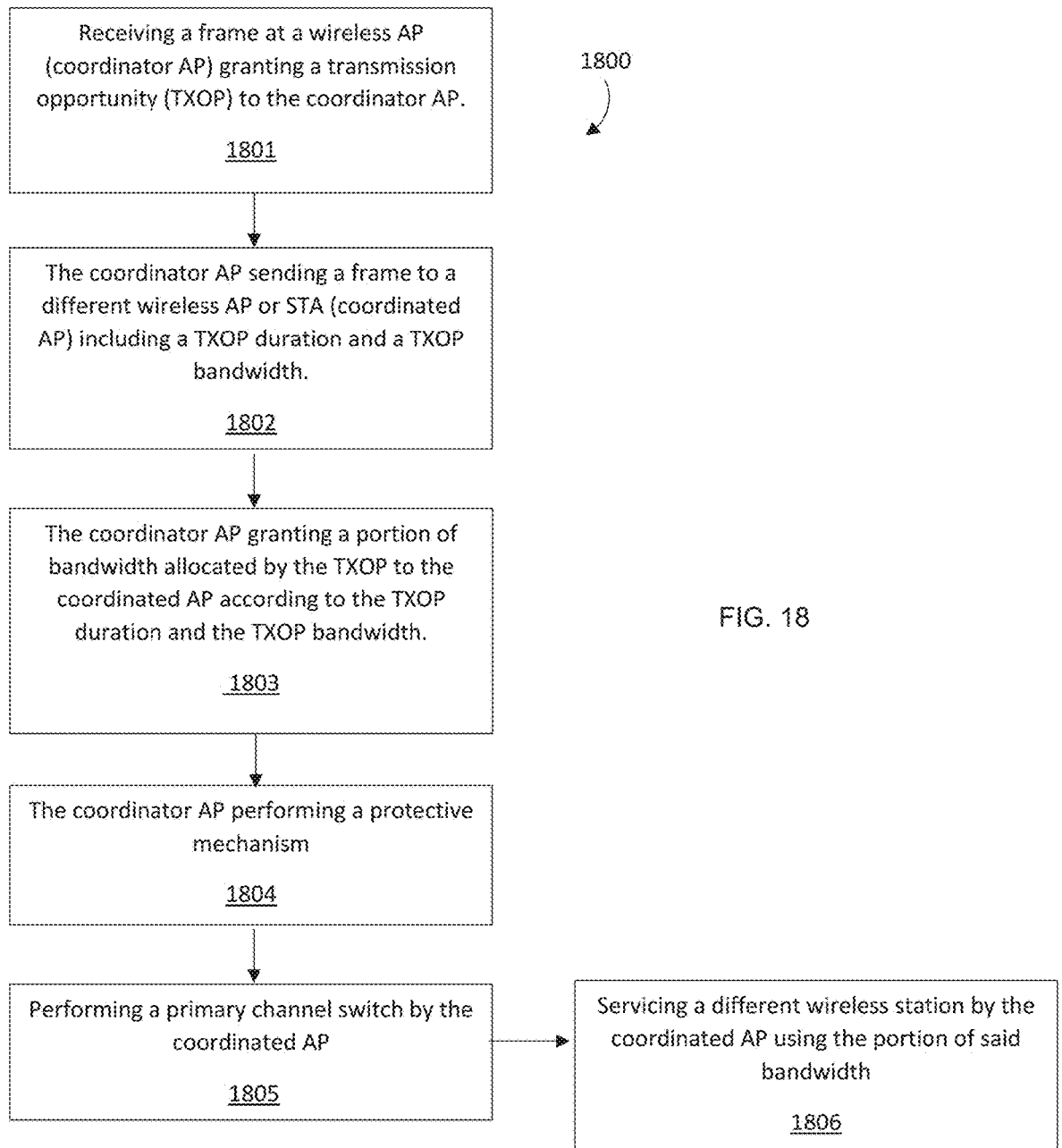
FIG. 18 is a flow chart depicting an exemplary sequence of computer implemented steps for performing coordinated multi-AP operation with a protection mechanism and a primary channel switch according to embodiments of the present invention.

With regard to FIG. 18, a flow chart of an exemplary sequence of computer implemented steps 1800 for coordinated multi-AP operation including a protection mechanism and a primary channel switch is depicted according to embodiments of the present invention.

At step 1801, a frame is received at a wireless AP (coordinator AP) granting a transmission opportunity (TXOP) to the wireless AP.

At step 1802, the coordinator AP sends a frame having an A-Control subfield to a different wireless AP or STA (coordinated AP). The A-Control subfield includes a TXOP duration and a TXOP bandwidth, and optionally a maximum transmission power.

At step 1803, the coordinator AP grants a portion of a bandwidth allocated by the TXOP to the coordinated AP according to the TXOP duration and the TXOP bandwidth.

At step 1804, a protective mechanism is performed by the coordinator AP. For example, other $3^{rd}$ party STAs associated with the coordinated APs may have access to the medium during the COA frame transmission if they are the hidden from the coordinator AP ("hidden nodes"). Therefore, the coordinator AP may trigger a MU-RTS and CTS frames exchange before the coordinated OFDAM transmissions for coordinated OFDMA NAV protection. After receiving a CTS frame, STAs associated with the coordinated AP may set the Basic NAV. According to some embodiments, step 1804 includes the coordinated AP transmitting a CTS-to-self frame on its primary channel after receiving an MU-RTS frame from the coordinator AP. The MU-RTS frame can indicate the CTS frame type (e.g., CTS frame or CTS-to-self frame).

At step 1805, a primary channel switch is performed by the coordinated AP. When the coordinator AP allocates to the coordinated AP bandwidth that does not cover the coordinated AP's own primary channel, the coordinated AP can request to transfer to a temporary primary channel. For example, the coordinator AP and the coordinated AP can exchange a primary channel switch (PCS) request and a primary channel switch (PCS) response frame before MU-RTS frame transmission. The coordinated AP then transmits a CTS-to-self frame on the switched temporary primary channel.

At step 1806, the coordinated AP services a different wireless station using the portion of the bandwidth.

Exemplary Computer Controlled System

Embodiments of the present invention are drawn to electronic systems for performing coordinated multi-AP channel access in a wireless network. The following discussion describes one such exemplary electronic system or computer system can be used as a platform for implementing embodiments of the present invention.

Figure 19:
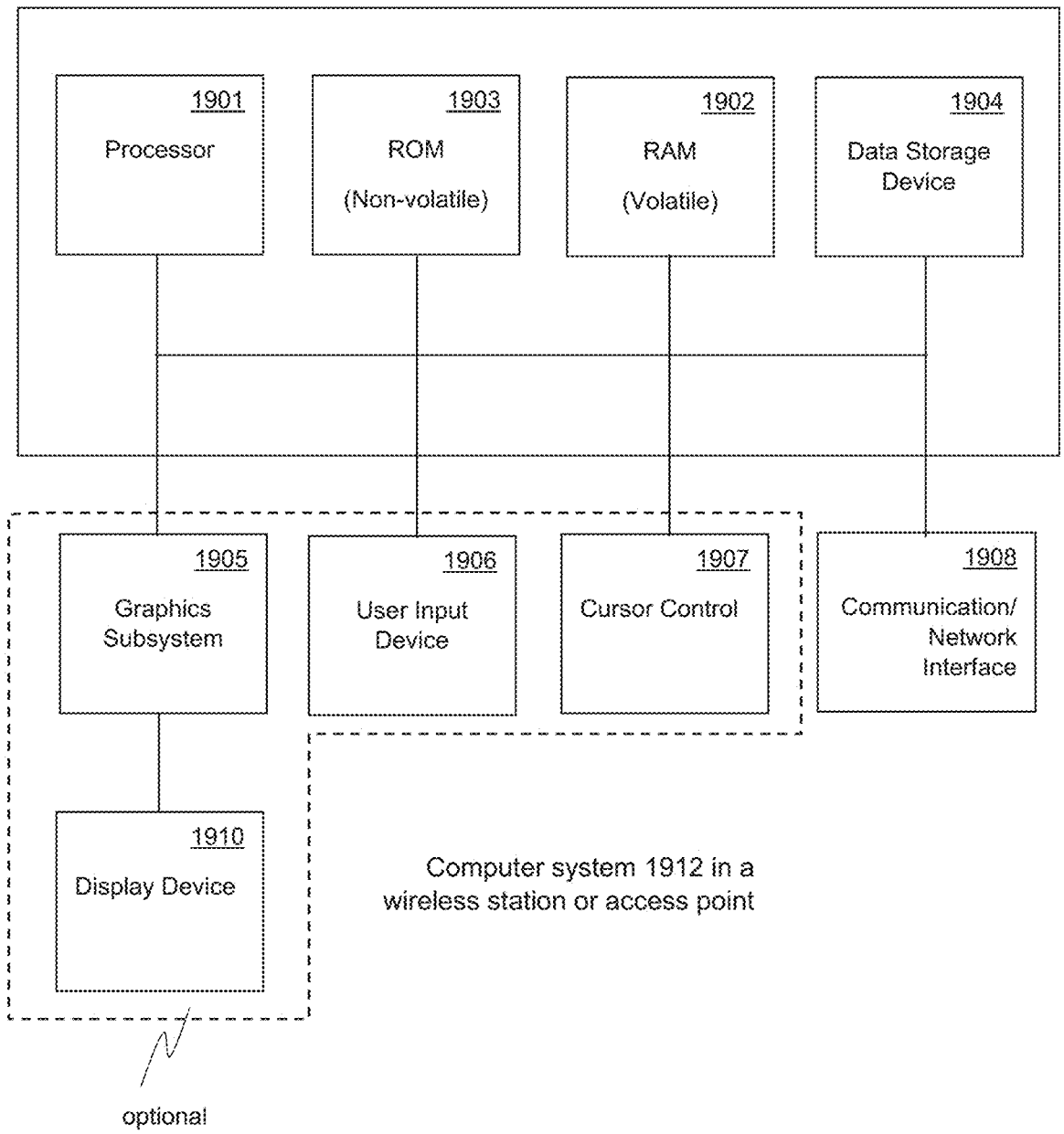
FIG. 19 is a block diagram depicting an exemplary computer system upon which embodiments of the present invention may be implemented.

In the example of FIG. 19, the exemplary computer system 1912 (e.g., a multi-band cooperative wireless access point AP or a multi-band cooperative wireless station STA) includes a central processing unit (such as a processor or a CPU) 1901 for running software applications and optionally an operating system. Random access memory 1902 and read-only memory 1903 store applications and data for use by the CPU 1901. Data storage device 1904 provides non-volatile storage for applications and data and may include fixed disk drives, removable disk drives, flash memory devices, and CD-ROM, DVD-ROM or other optical storage devices. The optional user inputs 1906 and 1907 comprise devices that communicate inputs from one or more users to the computer system 1912 (e.g., mice, joysticks, cameras, touch screens, and/or microphones).

A communication or network interface 1908 includes one or more transceivers and allows the computer system 1912 to communicate with other computer systems, networks, or devices via an electronic communications network, including wired and/or wireless communication and including an Intranet or the Internet (e.g., 802.19 wireless standard). The communication or network interface 1908 can transmit frames for performing coordinated OFDMA link setup, for performing a primary channel switch, and for granting partial bandwidth of a TXOP to a coordinated AP over a wireless network according to embodiments of the present invention.

The optional display device 1910 may be any device capable of displaying visual information in response to a signal from the computer system 1912 and may include a flat panel touch sensitive display, for example, and may be remotely disposed. The components of the computer system 1912, including the CPU 1901, memory 1902/1903, data storage 1904, user input devices 1906, and graphics subsystem 1905 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of coordinating transmissions of a first wireless access point (AP) using a second wireless AP, the method comprising:

receiving a frame granting a transmission opportunity (TXOP) at the second wireless AP, wherein the first wireless AP is configured as a wireless station. the first wireless AP transmits data frames to a first basic service set (BSS), and the second wireless AP transmits data frames to a second BSS;

sending a frame from the second wireless AP to the first wireless AP, the frame comprising a TXOP duration and a TXOP bandwidth; and signaling the first wireless AP using the second wireless AP to grant a portion of a bandwidth allocated by the TXOP to the first wireless AP according to the TXOP duration and the TXOP bandwidth, wherein the portion of the bandwidth is available for use by the first wireless AP.

2. The method described in claim 1, wherein the portion of bandwidth comprises one or more 20 MHz wireless channels.

3. The method described in claim 1, wherein the frame further comprises a maximum transmit power, and wherein the first wireless AP transmits data frames to the wireless station in the first BSS using the maximum transmit power.

4. The method described in claim 1, further comprising the second wireless AP scheduling an RU for downlink and uplink transmission of the first wireless AP, wherein the RU is within an allocated bandwidth indicated by the TXOP bandwidth.

5. The method described in claim 4, wherein the second wireless AP schedules the RU using a Coordinated OFDMA Announcement (COA) control frame.

6. The method as described in claim 1, further comprising the first wireless AP performing a channel switch from a first primary channel to a second primary channel.

7. The method described in claim 6, wherein the second primary channel is within an allocated bandwidth indicated by the TXOP bandwidth.

8. The method described in claim 1, further comprising the second wireless AP reporting a DL buffer status and a UL buffer status of the second BSS.

9. The method described in claim 1, further comprising performing a protection mechanism using the first wireless AP.

10. The method described in claim 9, wherein the performing the protection mechanism comprises performing an RTS/CTS hand shake.

11. The method described in claim 10, further comprising:
initiating PIFS using the first wireless AP;
performing a CCA during the PIFS using the first wireless AP; and
sending an RTS frame when the CCA is idle during the PIFS.

12. The method described in claim 1, further comprising synchronizing uplink and downlink transmissions of the first BSS and the second BSS, wherein the synchronizing mitigates adjacent channel interference of the first wireless AP and the second wireless AP.

13. The method described in claim 12, wherein the synchronizing comprises the second wireless AP indicating an uplink duration and a downlink duration using an A-control subfield of the frame.

14. A coordinator wireless access point (AP) comprising:
a processor;
a memory coupled to the processor and comprising instructions that when executed by the processor perform a method for coordinating transmissions of a coordinated wireless AP, the method comprising:

receiving a frame granting a transmission opportunity (TXOP);
sending a frame comprising an A-Control subfield to the coordinated wireless AP, the A-Control subfield comprising a TXOP duration and a TXOP bandwidth, wherein the coordinated AP is configured as a wireless station, and the coordinated wireless AP transmits data frames to a first basic service set (BSS);
transmitting data frames to a second BSS; and
signaling the coordinated wireless AP to grant a portion of a bandwidth allocated by the TXOP to the coordinator wireless AP according to the TXOP duration and the TXOP bandwidth,
wherein the portion of the bandwidth is for use by the coordinated wireless AP.

15. The coordinator wireless AP described in claim 14, wherein the portion of bandwidth comprises one or more 20 MHz wireless channels.

16. The coordinator wireless AP described in claim 14, wherein the method further comprises the coordinator wireless AP scheduling an RU for downlink and uplink transmission of the coordinated wireless AP, and wherein the RU is within an allocated bandwidth indicated by the TXOP bandwidth.

17. The coordinator wireless AP described in claim 16, wherein the second wireless AP schedules the RU using a Coordinated OFDMA Announcement (COA) control frame.

18. The coordinator wireless AP as described in claim 14, wherein the method further comprises the coordinated wireless AP performing a channel switch from a first primary channel to a second primary channel.

19. A non-transitory computer-readable storage medium having embedded therein program instructions, which when executed by one or more processors of a device, cause the device to execute a process for coordinating transmissions of a first wireless access point (AP) using a second wireless AP, the method comprising:
receiving a frame granting a transmission opportunity (TXOP) at the second wireless AP, wherein the first wireless AP is configured as a wireless station, the first wireless AP is configured as a wireless station, the first wireless AP transmits data frames to a first basic service set (BSS), and the second wireless AP transmits data frames to a second BSS;
sending a frame comprising an A-Control subfield from the second wireless AP to a first wireless AP, the A-Control subfield comprising a TXOP duration and a TXOP bandwidth; and
signaling he first wireless AP using the second wireless AP to grant a portion of a bandwidth allocated by the TXOP to the first wireless AP according to the TXOP duration and the TXOP bandwidth,
wherein the first wireless AP services a wireless station using the portion of the bandwidth.

* * * * *